(12) United States Patent
Miyata et al.

(10) Patent No.: US 11,821,424 B2
(45) Date of Patent: Nov. 21, 2023

(54) GEARED COMPRESSOR

(71) Applicant: MITSUBISHI HEAVY INDUSTRIES COMPRESSOR CORPORATION, Tokyo (JP)

(72) Inventors: Hiroyuki Miyata, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 18/172,539

(22) Filed: Feb. 22, 2023

(65) Prior Publication Data
US 2023/0272796 A1    Aug. 31, 2023

(30) Foreign Application Priority Data
Feb. 25, 2022 (JP) .................... 2022-027381

(51) Int. Cl.
*F04C 18/08*    (2006.01)
*F04D 17/12*    (2006.01)
*F04D 29/66*    (2006.01)

(52) U.S. Cl.
CPC ............ *F04C 18/084* (2013.01); *F04D 17/12* (2013.01); *F04D 29/666* (2013.01); *F05D 2210/12* (2013.01); *F05D 2260/96* (2013.01)

(58) Field of Classification Search
CPC ...... F04C 18/084; F04D 17/12; F04D 29/666; F05D 2210/12; F05D 2260/96
See application file for complete search history.

(56) References Cited

U.S. PATENT DOCUMENTS

| | | | |
|---|---|---|---|
| 5,382,132 A * | 1/1995 | Mendel | F04D 25/028 |
| | | | 415/60 |
| 10,100,837 B2 | 10/2018 | Kempter et al. | |
| 2010/0098534 A1* | 4/2010 | Small | F04D 29/056 |
| | | | 415/204 |
| 2014/0161588 A1* | 6/2014 | Miyata | F04D 17/12 |
| | | | 415/17 |
| 2016/0186764 A1* | 6/2016 | Lissoni | F04D 17/12 |
| | | | 417/423.1 |
| 2017/0218963 A1* | 8/2017 | Kobayashi | F04D 25/16 |

FOREIGN PATENT DOCUMENTS

| | | |
|---|---|---|
| CN | 203130565 U | 8/2013 |
| EP | 2740941 A1 | 6/2014 |
| JP | 5863320 B2 | 2/2016 |

* cited by examiner

*Primary Examiner* — Shafiq Mian
(74) *Attorney, Agent, or Firm* — Osha Bergman Watanabe & Burton LLP (57) ABSTRACT

A geared compressor includes a drive gear, a first intermediate gear, a second intermediate gear, a first impeller and a second impeller connected to a first driven gear, and a third impeller and a fourth impeller connected to a second driven gear. When viewed from an axial direction, a drive axis of the drive gear is disposed below a first intermediate axis of the first intermediate gear, a second intermediate axis of the second intermediate gear, a first driven axis of the first driven gear, and a second driven axis of the second driven gear in a vertical direction. The first impeller has a larger outer diameter than the second impeller, the third impeller, and the fourth impeller.

4 Claims, 4 Drawing Sheets

GEARED COMPRESSOR

BACKGROUND OF THE INVENTION

Field of the Invention

The present disclosure relates to a geared compressor.

Priority is claimed on Japanese Patent Application No. 2022-027381, filed on Feb. 25, 2022, the content of which is incorporated herein by reference.

Description of Related Art

A centrifugal compressor is known as a device for compressing a fluid to produce a compressed fluid. As a kind of the centrifugal compressor, a geared compressor is known, in which the fluid is compressed step by step with a plurality of impellers via a plurality of gears. For example, Patent Document 1 discloses a geared compressor including a drive gear that is rotationally driven by a drive device, a first intermediate gear and a second intermediate gear that mesh with the drive gear, a first driven gear that meshes with the first intermediate gear, and a second driven gear that meshes with the second intermediate gear. The geared compressor of Patent Document 1 includes two first-stage compression sections connected to a first driven shaft of the first driven gear, and a second compression section and a third compression section that are connected to a second driven shaft of the second driven gear. Each compression section has an impeller. The fluid compressed by the two first-stage compression sections flows through the second compression section and the third compression section in that order and is gradually pressurized.

CITATION LIST

[Patent Document]

[Patent Document 1] Japanese Patent No. 5863320

SUMMARY OF THE INVENTION

Incidentally, as in Patent Document 1, when two intermediate gears mesh with the drive gear at positions separated from each other, one of the two intermediate gears receives both an upward load in a vertical direction and a pressure load in a horizontal direction from the drive gear and the driven gear. Then, due to the upward load in the vertical direction, a lifting force is applied to the intermediate gear. In a case where the upward load in the vertical direction and a weight of the intermediate gear are balanced, if the pressure load in the horizontal direction received from the drive gear and the pressure load in the horizontal direction received from the driven gear are balanced, the intermediate gear becomes unstable. In this state, the rotation of the intermediate gear at a high speed may cause destabilizing vibration in the intermediate gear. In particular, in a case where sizes of the impellers of the compression sections connected to the driven gears meshing with the intermediate gears are different for each end portion, the vibration of the intermediate gear becomes significant.

The present disclosure provides a geared compressor capable of suppressing vibration of an intermediate gear even if impellers connected to driven gears have different sizes.

A geared compressor according to the present disclosure includes a drive gear that configured to rotate about a drive axis by rotation of a drive device; a first intermediate gear that meshes with the drive gear and configured to rotate about a first intermediate axis parallel to the drive axis; a second intermediate gear that meshes with the drive gear at a position spaced apart from the first intermediate gear and configured to rotate about a second intermediate axis parallel to the drive axis; a first driven gear that meshes with the first intermediate gear at a position spaced apart from the drive gear and configured to rotate about a first driven axis parallel to the drive axis; a second driven gear that meshes with the second intermediate gear at a position spaced apart from the drive gear and configured to rotate about a second driven axis parallel to the drive axis; a first impeller and a second impeller that are connected to the first driven gear and configured to compress a working fluid supplied from an outside by rotation of the first driven gear; and a third impeller and a fourth impeller that are connected to the second driven gear and configured to compress a working fluid supplied from the outside by rotation of the second driven gear, in which, when viewed from an axial direction in which the drive axis extends, the drive axis is disposed below the first intermediate axis, the second intermediate axis, the first driven axis, and the second driven axis in a vertical direction, and in a case where the working fluid is compressed in order from the first impeller to the fourth impeller, the first impeller has a larger outer diameter than outer diameters of the second impeller, the third impeller, and the fourth impeller.

According to the geared compressor of the present disclosure, vibration of a rotating shaft can be suppressed even if the impellers connected to the driven gears have different sizes.

DETAILED DESCRIPTION OF THE INVENTION

Hereinafter, an embodiment for implementing a geared compressor 1 according to the present disclosure will be described with reference to the accompanying drawings. However, the present disclosure is not limited to only this embodiment.

(Configuration of Geared Compressor)

Figure 1:
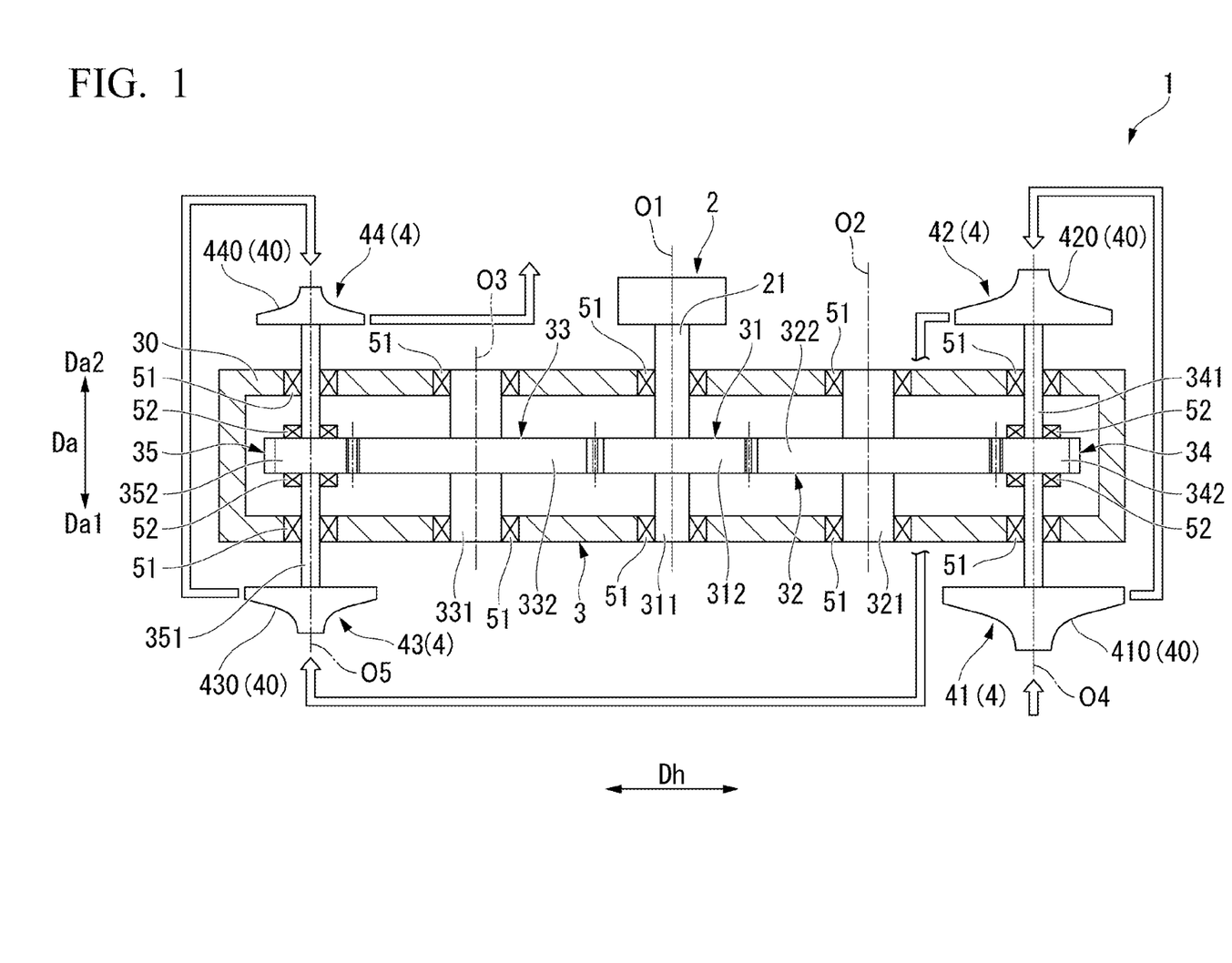
FIG. 1 is a schematic plan view showing a geared compressor according to an embodiment of the present disclosure.
Figure 2:
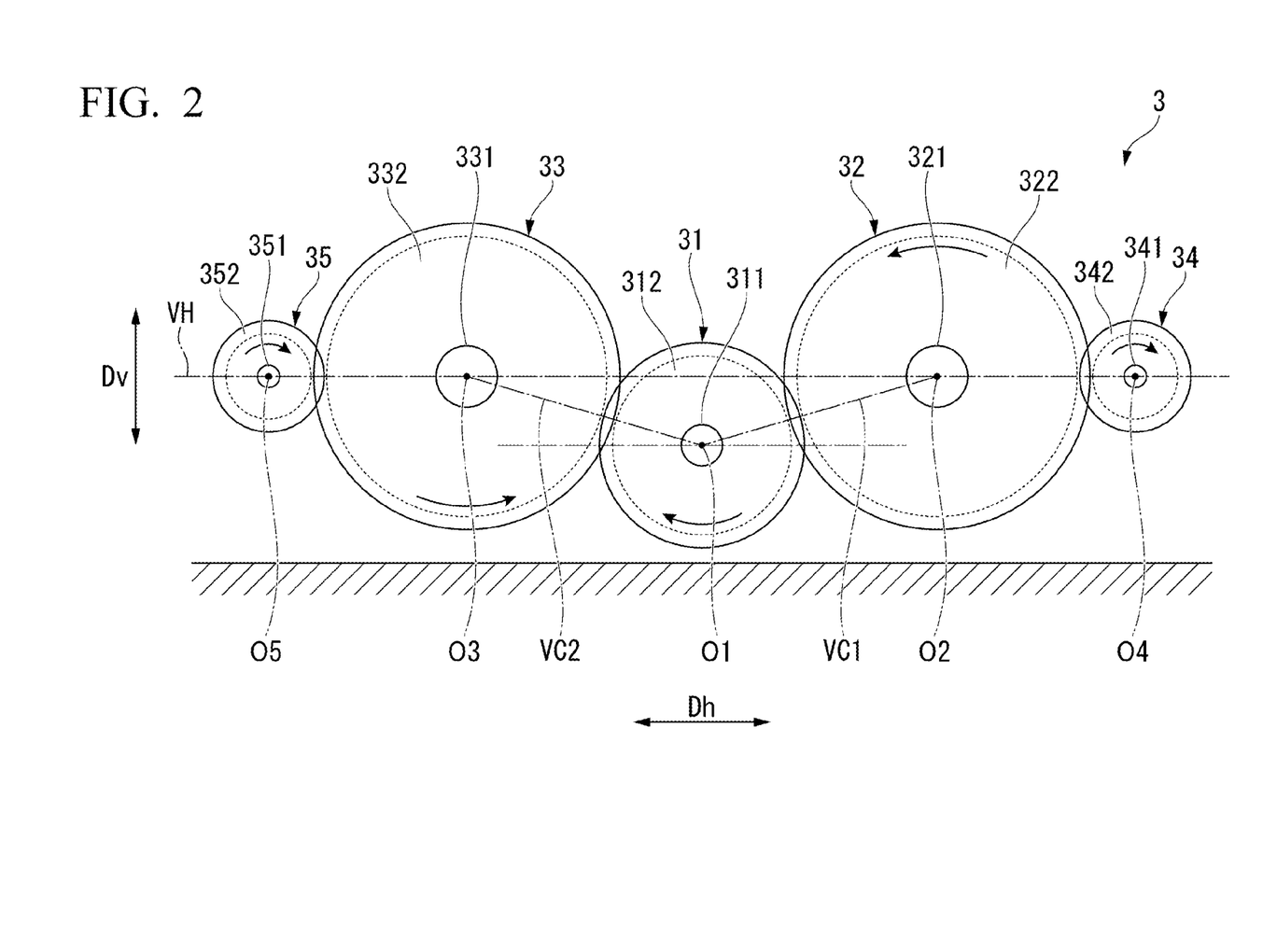
FIG. 2 is a schematic view showing positional relationships of gears when viewed from an axial direction of the geared compressor according to the embodiment of the present disclosure.

As shown in FIGS. 1 and 2, the geared compressor 1 has a multi-axis and multi-stage configuration that drives a plurality of impellers 40. The geared compressor 1 has a drive device 2, a compression section drive mechanism 3, and a plurality of compression sections 4.

(Drive Device)

The drive device 2 generates power for driving the geared compressor 1. For example, a steam turbine can be used as the drive device 2. An output shaft 21 of the drive device 2 is disposed coaxially with a drive axis O1 of a drive gear 31 which will be described later. Therefore, the output shaft 21 of the drive device 2 is rotatable around the drive axis O1.

(Compression Section Drive Mechanism)

The compression section drive mechanism 3 rotates an impeller 40 of a compression section 4, which is a device for compressing a working fluid supplied from the outside, by transmission of power (torque) generated by the drive device 2. The compression section drive mechanism 3 of the present embodiment includes a gear case 30, a drive gear 31, a first intermediate gear 32, a second intermediate gear 33, a first driven gear 34, a second driven gear 35, a plurality of radial bearings 51, and a plurality of thrust bearings 52. The gear case 30 is a casing for accommodating a plurality of gears therein. The gear case 30 of the present embodiment accommodates the drive gear 31, the first intermediate gear 32, the second intermediate gear 33, the first driven gear 34, and the second driven gear 35 in an internal space thereof.

The drive gear 31 is accommodated in the gear case 30. The drive gear 31 is rotated by the rotation of the steam turbine that is the drive device 2. The drive gear 31 has a drive spindle 311 and a drive gear main body 312. The drive spindle 311 is formed in a cylindrical shape extending around the drive axis O1 extending in a horizontal direction Dh.

One end portion of the drive spindle 311 in an axial direction Da in the present embodiment is integrally connected to the output shaft 21 of the drive device 2 via a coupling (not shown). Therefore, the drive spindle 311 is rotated around the drive axis O1 by the rotation of the drive device 2.

In the present embodiment, a direction in which the drive axis O1 extends is simply referred to as the "axial direction Da". Further, of two sides in the axial direction Da, one side Da1 (first side) is simply referred to as "one side Da1", and the opposite side Da2 (second side) is simply referred to as "the other side Da2". The one side Da1 in the axial direction Da in the present embodiment is a side on which the drive device 2 is not disposed with respect to the drive spindle 311. That is, the other side Da2 in the axial direction Da in the present embodiment is a side on which the drive device 2 is disposed with respect to the drive spindle 311.

The drive spindle 311 is disposed so as to protrude from the drive gear main body 312 to both sides in the axial direction Da. An end portion of the drive spindle 311 on the other side Da2 in the axial direction Da protrudes outside the gear case. The drive spindle 311 is rotatably supported on the gear case by a pair of the radial bearings 51 at positions separated from the drive gear main body 312 to the one side Da1 and the other side Da2 in the axial direction Da.

The drive gear main body 312 is fixed to an outer periphery of the drive spindle 311. The drive gear main body 312 is, for example, a helical gear that expands around the drive spindle 311. The drive gear main body 312 expands so as to protrude in a vertical direction Dv and a horizontal direction Dh perpendicular to the drive axis O1.

The first intermediate gear 32 is accommodated in the gear case 30. The first intermediate gear 32 rotates with the rotation of the drive gear 31. The first intermediate gear 32 has a first intermediate spindle 321 and a first intermediate gear main body 322.

The first intermediate spindle 321 is formed in a cylindrical shape extending around a first intermediate axis O2 parallel to the drive axis O1. The first intermediate spindle 321 rotates around the first intermediate axis O2 by the rotation of the drive gear 31. The first intermediate spindle 321 is disposed so as to protrude from the first intermediate gear main body 322 to both sides in the axial direction Da. Both ends of the first intermediate spindle 321 are rotatably supported on the gear case by a pair of the radial bearings 51 at positions separated from the first intermediate gear main body 322 to the one side Da1 and the other side Da2 in the axial direction Da.

The first intermediate gear main body 322 meshes with the drive gear main body 312. The first intermediate gear main body 322 is fixed to an outer periphery of the first intermediate spindle 321. The first intermediate gear main body 322 is, for example, a helical gear that expands around the first intermediate spindle 321. The first intermediate gear main body 322 expands so as to protrude in the vertical direction Dv and the horizontal direction Dh perpendicular to the first intermediate axis O2.

The second intermediate gear 33 is accommodated in the gear case 30. The second intermediate gear 33 rotates with the rotation of the drive gear 31. The second intermediate gear 33 is disposed at a position separated from the first intermediate gear 32. The second intermediate gear 33 has a second intermediate spindle 331 and a second intermediate gear main body 332.

The second intermediate spindle 331 is formed in a cylindrical shape extending around a second intermediate axis O3 parallel to the drive axis O1 and the first intermediate axis O2. The second intermediate spindle 331 rotates around the second intermediate axis O3 by the rotation of the drive gear 31. The second intermediate spindle 331 is disposed so as to protrude from the second intermediate gear main body 332 to both sides in the axial direction Da. Both ends of the second intermediate spindle 331 are rotatably supported on the gear case by a pair of the radial bearings 51 at positions separated from the second intermediate gear main body 332 to the one side Da1 and the other side Da2 in the axial direction Da.

The second intermediate gear main body 332 meshes with the drive gear main body 312. The second intermediate gear main body 332 does not mesh with the first intermediate gear main body 322. The second intermediate gear main body 332 is fixed to an outer periphery of the second intermediate spindle 331. The second intermediate gear main body 332 is, for example, a helical gear that expands around the second intermediate spindle 331. The second intermediate gear main body 332 expands so as to protrude in the vertical direction Dv and the horizontal direction Dh perpendicular to the second intermediate axis O3.

The first driven gear 34 is accommodated in the gear case 30. The first driven gear 34 rotates with the rotation of the first intermediate gear 32. The first driven gear 34 is disposed at a position separated from the drive gear 31 and the second intermediate gear 33. The first driven gear 34 has a first driven spindle 341 and a first driven gear main body 342. The first driven spindle 341 is formed in a cylindrical shape extending around a first driven axis O4 parallel to the drive axis O1. The first driven spindle 341 rotates around the first driven axis O4 by the rotation of the first intermediate gear 32. The first driven spindle 341 is disposed so as to protrude from the first driven gear main body 342 to both sides in the axial direction Da. Both ends of the first driven spindle 341 are disposed at positions protruding outside the gear case. The first driven spindle 341 is rotatably supported on the gear case by a pair of the radial bearings 51 at positions separated from the first driven gear main body 342 to the one side Da1 and the other side Da2 in the axial direction Da. Furthermore, the first driven spindle 341 is supported by the thrust bearings 52 inside the pair of radial bearings 51 in the axial direction Da. The thrust bearing 52 has, for example, a thrust collar (not shown) extending in a disc shape from an outer peripheral surface of the first driven spindle 341. The thrust bearing 52 restricts movement of the first driven spindle 341 in the axial direction Da.

The first driven gear main body 342 meshes with the first intermediate gear main body 322. The first driven gear main body 342 does not mesh with the drive gear main body 312 and the second intermediate gear main body 332. The first driven gear main body 342 is fixed to an outer periphery of the first driven spindle 341. The first driven gear main body 342 is, for example, a helical gear that expands around the first driven spindle 341. The first driven gear main body 342 expands so as to protrude in the vertical direction Dv and the horizontal direction Dh perpendicular to the first driven axis O4.

The second driven gear 35 is accommodated in the gear case 30. The second driven gear 35 rotates with the rotation of the second intermediate gear 33. The second driven gear 35 is disposed at a position separated from the drive gear 31 and the first intermediate gear 32. The second driven gear 35 has a second driven spindle 351 and a second driven gear main body 352.

The second driven spindle 351 is formed in a cylindrical shape extending around a second driven axis O5 parallel to the drive axis O1. The second driven spindle 351 rotates around the second driven axis O5 by the rotation of the second intermediate gear 33. The second driven spindle 351 is disposed so as to protrude from the second driven gear main body 352 to both sides in the axial direction Da. Both ends of the second driven spindle 351 are disposed at positions protruding outside the gear case. The second driven spindle 351 is rotatably supported on the gear case by a pair of the radial bearings 51 at positions separated from the second driven gear main body 352 to the one side Da1 and the other side Da2 in the axial direction Da. Further, the second driven spindle 351 is supported by the thrust bearings 52 inside the pair of radial bearings 51 in the axial direction Da. The thrust bearing 52 restricts movement of the second driven spindle 351 in the axial direction Da.

The second driven gear main body 352 meshes with the second intermediate gear main body 332. The second driven gear main body 352 does not mesh with the drive gear main body 312 and the first intermediate gear main body 322. The second driven gear main body 352 is fixed to an outer periphery of the second driven spindle 351. The second driven gear main body 352 is, for example, a helical gear that expands around the second driven spindle 351. The second driven gear main body 352 expands so as to protrude in the vertical direction Dv and the horizontal direction Dh perpendicular to the second driven axis O5.

In addition, as shown in FIG. 2, an outer diameter of the drive gear main body 312 in the present embodiment is formed smaller than an outer diameter of each of the first intermediate gear main body 322 and the second intermediate gear main body 332. Therefore, the number of teeth of the drive gear main body 312 is less than the number of teeth of the first intermediate gear main body 322. For the "outer diameter" of the gear in the present embodiment, for example, a root circle diameter, a tip circle diameter, a pitch circle diameter, and the like, which can be measured as a distance (dimension) from a center axis in each gear, are adopted. The outer diameter of the drive gear main body 312 is formed larger than an outer diameter of each of the first driven gear main body 342 and the second driven gear main body 352. Therefore, the number of teeth of the drive gear main body 312 is greater than the number of teeth of the first driven gear main body 342. The outer diameter of the first intermediate gear main body 322 is formed larger than the outer diameter of the first driven gear main body 342. Therefore, the number of teeth of the first intermediate gear main body 322 is greater than the number of teeth of the first driven gear main body 342. The outer diameter of the first intermediate gear main body 322 is the same as the outer diameter of the second intermediate gear main body 332. Therefore, the number of teeth of the first intermediate gear main body 322 is the same as the number of teeth of the second intermediate gear main body 332.

Further, when viewed from the axial direction Da, the first intermediate axis O2, the second intermediate axis O3, the first driven axis O4, and the second driven axis O5 are disposed such that their positions in the vertical direction Dv are the same. That is, when viewed from the axial direction Da, the first driven axis O4 and the second driven axis O5 are disposed on an imaginary horizontal line VH connecting the first intermediate axis O2 and the second intermediate axis O3. The imaginary horizontal line VH is an imaginary straight line extending in the horizontal direction Dh orthogonal to the vertical direction Dv. Furthermore, when viewed from the axial direction Da, the first intermediate spindle 321, the second intermediate spindle 331, the first driven spindle 341, and the second intermediate spindle 331 are arranged in parallel such that their positions in the vertical direction Dv overlap.

In the present embodiment, when viewed from the axial direction Da, the first intermediate axis O2 and the second intermediate axis O3, and the first driven axis O4 and the second driven axis O5 are arranged at the same position in the vertical direction Dv, but the present disclosure is not limited to such an arrangement. That is, when viewed from the axial direction Da, the first driven axis O4 and the second driven axis O5 may be displaced in the vertical direction Dv with respect to the first intermediate axis O2 and the second intermediate axis O3.

Further, when viewed from the axial direction Da, the drive axis O1 is disposed below the first intermediate axis O2, the second intermediate axis O3, the first driven axis O4, and the second driven axis O5 in the vertical direction Dv. Specifically, when viewed from the axial direction Da, the drive spindle 311 is disposed below the first intermediate spindle 321, the second intermediate spindle 331, the first driven spindle 341, and the second driven spindle 351 such that their positions in the vertical direction Dv do not overlap. When viewed from the axial direction Da, the drive spindle 311 is disposed below the imaginary horizontal line VH in the vertical direction Dv so as not to overlap the imaginary horizontal line VH. When viewed from the axial direction Da, a distance between the drive spindle 311 and the first intermediate spindle 321 is the same as a distance between the drive spindle 311 and the second intermediate spindle 331. Here, an imaginary line connecting the drive axis O1 and the first intermediate axis O2 is referred to as a first imaginary inclined line VC1. An offset angle formed by the first imaginary inclined line VC1 with respect to the imaginary horizontal line VH is preferably 15° or more and 35° or less. Further, the offset angle formed by the first imaginary inclined line VC1 with respect to the imaginary horizontal line VH is more preferably 20° or more and 30° or less. Similarly, an imaginary line connecting the drive axis O1 and the second intermediate axis O3 is referred to as a second imaginary inclined line VC2. An offset angle formed by the second imaginary inclined line VC2 with respect to the imaginary horizontal line VH is preferably 15° or more and 35° or less. Further, the offset angle formed by the second imaginary inclined line VC2 with respect to the imaginary horizontal line VH is more preferably 20° or more and 30° or less.

(Compression Section)

As shown in FIG. 1, the compression section 4 compresses the working fluid by being rotated by either the first driven gear 34 or the second driven gear 35. The compression section 4 has an impeller 40 which compresses the working fluid supplied from the outside by rotating. A plurality of compression sections 4 are disposed. In the present embodiment, the geared compressor 1 includes four compression sections 4 including a first-stage compression section 41, a second-stage compression section 42, a third-stage compression section 43, and a fourth-stage compression section 44 as the plurality of compression sections 4. The number of the compression sections 4 in the geared compressor 1 is not limited to four, and may be five or more or three or less.

The first-stage compression section 41 is connected to the first driven spindle 341. The first-stage compression section 41 has a first impeller 410 and a scroll casing (not shown). The scroll casing covers the first impeller 410 and has a gas introduction portion and a gas outlet. The first impeller 410 is fixed to an end portion of the first driven spindle 341 on the one side Da1 in the axial direction Da. The first impeller 410 compresses the working fluid supplied from the outside by the rotation of the first driven gear 34. The first impeller 410 is formed to be the largest among the plurality of impellers 40 in a case where the working fluid is compressed in order from the first impeller 410 to the fourth impeller 440 that will be described later.

The second-stage compression section 42 compresses the working fluid compressed by the first-stage compression section 41. The second-stage compression section 42 is connected to the first driven spindle 341. The second-stage compression section 42 has a second impeller 420 and a scroll casing (not shown). The scroll casing covers the second impeller 420 and has a gas introduction portion and a gas outlet. The second impeller 420 is fixed to an end portion of the first driven spindle 341 on the other side Da2 in the axial direction Da. The second impeller 420 compresses the working fluid supplied from the outside by the rotation of the first driven gear 34. The second impeller 420 is formed to be the second largest among the plurality of impellers 40.

The third-stage compression section 43 compresses the working fluid compressed by the second-stage compression section 42. The third-stage compression section 43 is connected to the second driven spindle 351. The third-stage compression section 43 has a third impeller 430 and a scroll casing (not shown). The scroll casing covers the third impeller 430 and has a gas introduction portion and a gas outlet. The third impeller 430 is fixed to an end portion of the second driven spindle 351 on the one side Da1 in the axial direction Da. The third impeller 430 compresses the working fluid supplied from the outside with the rotation of the second driven gear 35. The third impeller 430 is formed to be the third largest among the plurality of impellers 40.

The fourth-stage compression section 44 compresses the working fluid compressed by the third-stage compression section 43. The fourth-stage compression section 44 is connected to the second driven spindle 351. The fourth-stage compression section 44 has a fourth impeller 440 and a scroll casing (not shown). The scroll casing covers the fourth impeller 440 and has a gas introduction portion and a gas outlet. The fourth impeller 440 is fixed to an end portion of the second driven spindle 351 on the other side Da2 in the axial direction Da. The fourth impeller 440 compresses the working fluid supplied from the outside by the rotation of the second driven gear 35. The fourth impeller 440 is formed to be the smallest among the plurality of impellers 40.

Each of the first impeller 410, the second impeller 420, the third impeller 430, and the fourth impeller 440 compresses the working fluid sucked into the scroll casing from the gas introduction portion while sending the working fluid to the outside of the impeller 40 in a radial direction via a flow path formed inside the scroll casing. The first-stage compression section 41, the second-stage compression section 42, the third-stage compression section 43, and the fourth-stage compression section 44 are connected via a piping (not shown). As a result, in the geared compressor 1, the working fluid flows through the first-stage compression section 41, the second-stage compression section 42, the third-stage compression section 43, and the fourth-stage compression section 44 in that order so that the working fluid is gradually compressed. A heat exchanger (not shown) may be disposed in the middle of the piping connecting the first-stage compression section 41, the second-stage compression section 42, the third-stage compression section 43, and the fourth-stage compression section 44.

(Operation and Effect)

Figure 3:
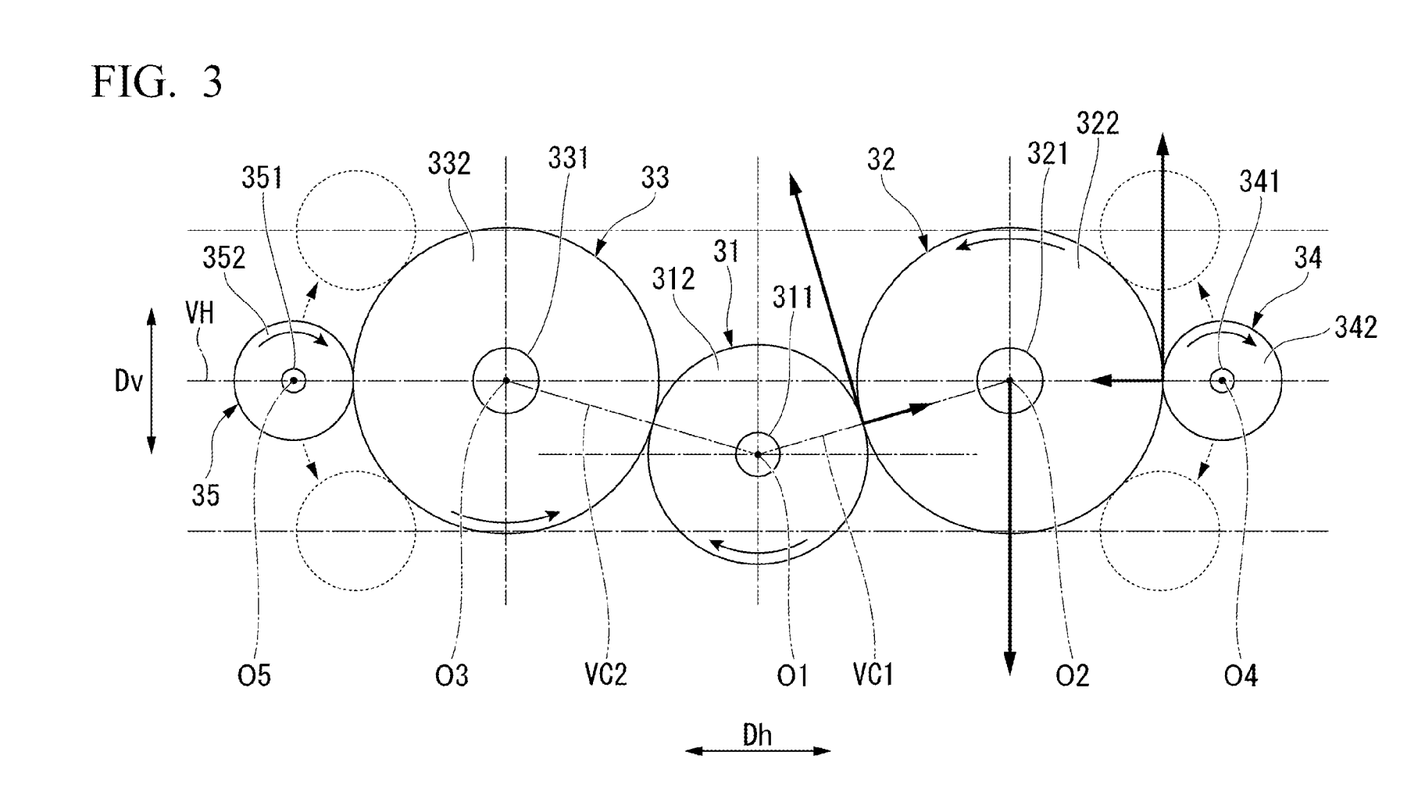
FIG. 3 is a schematic view showing a case where positions of a first driven gear and a second driven gear are shifted from each other from the positional relationships of the gears when viewed from the axial direction of the geared compressor according to the embodiment of the present disclosure.

In the geared compressor 1 having the above configuration, as shown in FIG. 3, the first intermediate gear 32 is interposed between the drive gear 31 and the first driven gear 34 when viewed from the axial direction Da. As a result, the first intermediate gear 32 receives the upward load in the vertical direction Dv and the pressure load in the horizontal direction Dh (force in the horizontal direction Dh) from the drive gear 31 and the first driven gear 34. Due to the upward load in the vertical direction Dv, a lifting force is applied to the first intermediate gear 32. In a case where the upward load in the vertical direction Dv and a weight of the first intermediate gear 32 are balanced, if the pressure load in the horizontal direction Dh received from the drive gear 31 and the pressure load in the horizontal direction Dh received from the first driven gear 34 are balanced, the first intermediate spindle 321 becomes unstable.

Here, the upward load in the vertical direction Dv and the pressure load in the horizontal direction Dh are loads that are generated by a tangential force when one gear is moved by an adjacent gear and a reaction force generated when moving the adjacent gear.

On the other hand, the inventors found that in a case where the upward load in the vertical direction Dv and the weight of the first intermediate gear 32 were balanced, when the pressure load in the horizontal direction Dh received from the drive gear 31 and the pressure load in the horizontal direction Dh received from the first driven gear 34 were balanced, eccentricity of the first intermediate gear 32 in the vertical direction Dv and the horizontal direction Dh with respect to the radial bearing 51 approached zero. As the eccentricity of the first intermediate gear 32 in the vertical direction Dv and the horizontal direction Dh approaches 0, a gap between the radial bearing 51 that supports the first intermediate spindle 321 and the first intermediate spindle 321 becomes uniform over the entire circumference. In this state, when the loads in the vertical direction Dv and the horizontal direction Dh acting on the first intermediate spindle 321 are balanced so that the load acting on the first intermediate spindle 321 becomes small, the first intermediate spindle 321 is supported in an unstable state by the radial bearing 51. This is because the rotation of the first intermediate spindle 321 at a high speed in this state causes unstable vibration in the first intermediate gear 32.

Further, as shown in FIG. 1, the first impeller 410 is formed to be the largest among the plurality of impellers 40. That is, the first driven spindle 341 has one end portion connected to the first impeller 410 and the other end portion connected to the second impeller 420 smaller than the first impeller 410. Therefore, in the first driven spindle 341, weights of the impellers 40 supported at both ends are different. As a result, the vibration of the first driven spindle 341 tends to become unstable, which may destabilize the first intermediate spindle 321.

However, as shown in FIG. 3, in the geared compressor 1 of the present embodiment having the above configuration, the drive gear 31 is disposed such that the drive axis O1 is disposed below the first intermediate axis O2 and the first driven axis O4 in the vertical direction Dv. Therefore, even in a case where the load acting upward in the vertical direction Dv on the first intermediate gear 32 and the weight of the first intermediate gear 32 are balanced, the pressure load in the horizontal direction Dh received from the drive gear 31 and the pressure load in the horizontal direction Dh received from the first driven gear 34 cannot be balanced. As a result, the first intermediate spindle 321 can maintain a slightly eccentric state with respect to the radial bearing 51 in the horizontal direction Dh. Thus, the first intermediate spindle 321 can be continuously supported by the radial bearing 51 in a stable state. Furthermore, even if the sizes of the impellers 40 connected to the first driven gear 34 and the second driven gear 35 are different, unstable vibration in the first intermediate gear 32 can be suppressed.

Further, when viewed from the axial direction Da, the positions of the first intermediate axis O2, the second intermediate axis O3, the first driven axis O4, and the second driven axis O5 are the same in the vertical direction Dv. Therefore, positional relationships of the first intermediate gear 32 and the second intermediate gear 33 with respect to the first driven gear 34 and the second driven gear 35 can be made the same. Therefore, it is possible to reduce a transmission torque to the first intermediate gear 32 when the load in the vertical direction Dv acting on the first intermediate gear 32 is balanced. By reducing the transmission torque, a state in which the load in the vertical direction Dv acting on the first intermediate gear 32 is balanced can be passed at an early timing after the geared compressor 1 is started and the first intermediate gear 32 starts to rotate. Therefore, at a timing when the geared compressor 1 is operating at a rated speed, the load in the vertical direction Dv acting on the first intermediate gear 32 is no longer balanced, and the unstable vibration in the first intermediate gear 32 can be effectively suppressed.

Further, when viewed from the axial direction Da, if the first driven axis O4 and the second driven axis O5 are disposed above the first intermediate axis O2 and the second intermediate axis O3 in the vertical direction Dv, the transmission torque to the first intermediate gear 32 when the load in the vertical direction Dv acting on the first intermediate gear 32 is balanced becomes large. Therefore, the load in the vertical direction Dv acting on the first intermediate gear 32 is more likely to be balanced in a state close to a timing when the geared compressor 1 is operating at a rated speed. As a result, there is a possibility that unstable vibration in the first intermediate gear 32 cannot be effectively suppressed.

Furthermore, when viewed from the axial direction Da, if the first driven axis O4 and the second driven axis O5 are disposed below the first intermediate axis O2 and the second intermediate axis O3 in the vertical direction Dv, the first driven axis O4 and the second driven axis O5 approach the drive axis O1. Therefore, the pressure loads in the horizontal direction Dh received by the first intermediate gear 32 and the second intermediate gear 33 from the first driven gear 34 when the loads in the vertical direction Dv acting on the first intermediate gear 32 and the second intermediate gear 33 are balanced become small. Thus, an amount of eccentricity in the horizontal direction Dh of the drive spindle 311 with respect to the radial bearing 51 may become small. As a result, there is a possibility that unstable vibration in the first intermediate gear 32 cannot be effectively suppressed.

Therefore, when viewed from the axial direction Da, a state in which the first intermediate axis O2, the second intermediate axis O3, the first driven axis O4, and the second driven axis O5 have the same position in the vertical direction Dv can most effectively suppress unstable vibration in the first intermediate gear 32.

In addition, there are only two positions of the respective axes in the vertical direction Dv, that is, the position of the drive axis O1 and the position of the first intermediate axis O2. As a result, the structure of the gear case 30 covering each gear can be simplified.

Figure 4:
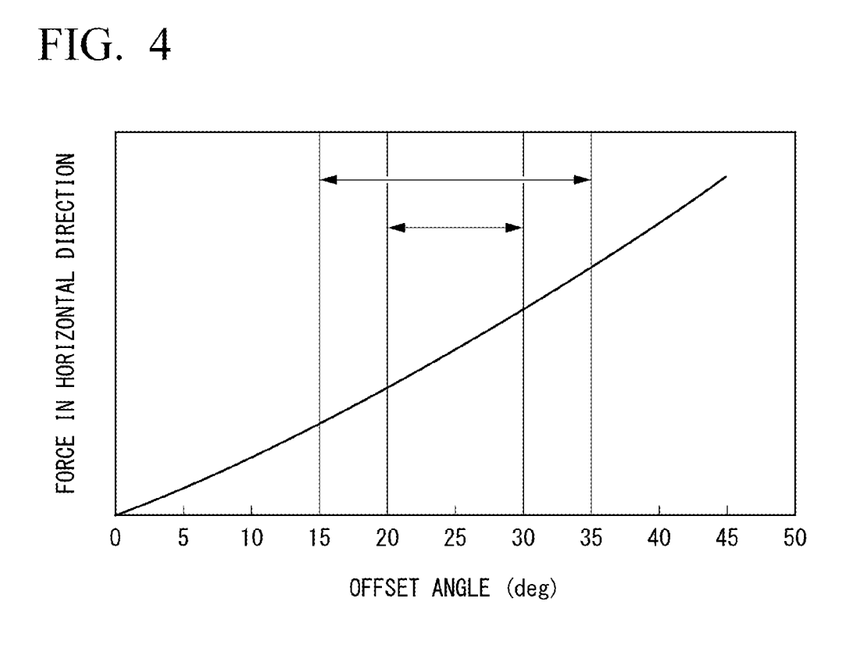
FIG. 4 is a graph showing a relationship between an offset angle of a drive gear with respect to a first intermediate gear and a second intermediate gear and a force in a horizontal direction generated between the first and second intermediate gears and the drive gear in a case where an upward load in a vertical direction and weights of the first intermediate gear and the second intermediate gear are balanced.

Furthermore, as shown in FIG. 4, when the offset angle becomes small, the pressure load in the horizontal direction Dh received by the first intermediate gear 32 from the drive gear 31 when the load in the vertical direction Dv acting on the first intermediate gear 32 is balanced becomes small. Thus, an amount of eccentricity in the horizontal direction Dh of the drive spindle 311 with respect to the radial bearing 51 may become small. As a result, there is a possibility that unstable vibration in the first intermediate gear 32 cannot be effectively suppressed.

Further, when the offset angle becomes large, the pressure load in the horizontal direction Dh received by the first intermediate gear 32 from the drive gear 31 when the load in the vertical direction Dv acting on the first intermediate gear 32 is balanced can become large. However, the position of the drive spindle 311 in the horizontal direction Dh becomes close to the first intermediate gear 32 and the second intermediate gear 33. As a result, the positions of the first driven spindle 341 and the second driven spindle 351 in the horizontal direction Dh also become close to each other. This limits the size of the impeller 40 that can be disposed on the first driven spindle 341 and the second driven spindle 351. Further, if an attempt is made to dispose a large impeller 40, the first intermediate gear 32 and the second intermediate gear 33 must be made large. As a result, a weight of a machine and a moment of inertia increase, making it impossible to optimize the compression section drive mechanism 3.

On the other hand, since the offset angle is 15° or more and 35° or less, the position of the drive spindle 311 in the horizontal direction Dh can be sufficiently separated from the first intermediate gear 32 and the second intermediate gear 33 while the pressure loads in the horizontal direction Dh received by the first intermediate gear 32 and the second intermediate gear 33 from the drive gear 31 are ensured. Thus, unstable vibration in the first intermediate gear 32 can be effectively suppressed without limiting the size of the impeller 40 that can be disposed.

Furthermore, since the offset angle is 20° or more and 30° or less, the unstable vibration in the first intermediate gear 32 can be more effectively suppressed without limiting the size of the impeller 40 that can be disposed.

Further, as shown in FIG. 3, the outer diameter of the drive gear 31 is made smaller than that of the first intermediate gear 32 and the second intermediate gear 33. Furthermore, the outer diameters of the first driven gear 34 and the second driven gear 35 are made smaller than that of the drive gear 31. Thus, regarding the first intermediate gear 32 and the second intermediate gear 33, the pressure load in the horizontal direction Dh received from the drive gear 31 can be larger than the pressure load in the horizontal direction Dh received from the first driven gear 34 and the second driven gear 35. As a result, the pressure load in the horizontal direction Dh received from the drive gear 31 and the pressure load in the horizontal direction Dh received from the first driven gear 34 and the second driven gear 35 can be reliably shifted. Thus, the drive spindle 311 can be reliably maintained in a slightly eccentric state with respect to the radial bearing 51 in the horizontal direction Dh. Therefore, the unstable vibration in the first intermediate gear 32 can be reliably suppressed.

Other Embodiments

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

In addition, the outer diameter of each gear is not limited to the shape of the embodiment. For example, the outer diameter of the first intermediate gear main body 322 is not limited to being the same as the outer diameter of the second intermediate gear main body 332. The outer diameter of the first intermediate gear main body 322 may be larger or smaller than the outer diameter of the second intermediate gear main body 332. Further, the outer diameter of the first driven gear main body 342 is not limited to being the same as the outer diameter of the second driven gear main body 352. Therefore, the outer diameter of the first driven gear main body 342 may be larger or smaller than the outer diameter of the second driven gear main body 352.

Further, if the outer diameters of the second impeller 420, the third impeller 430, and the fourth impeller 440 are smaller than the outer diameter of the first impeller 410, a size relationship between the respective impellers 40 is not limited to the shape in the embodiment. The outer diameters of the second impeller 420, the third impeller 430, and the fourth impeller 440 may be the same, and only some of the second impeller 420, the third impeller 430, and the fourth impeller 440 may have the same outer diameter.

APPENDIX

For example, the geared compressor 1 described in the embodiment is understood as follows.

(1) A geared compressor 1 according to a first aspect includes a drive gear 31 that configured to rotate about a drive axis O1 by rotation of a drive device 2; a first intermediate gear 32 that meshes with the drive gear 31 and configured to rotate about a first intermediate axis O2 parallel to the drive axis O1; a second intermediate gear 33 that meshes with the drive gear 31 at a position spaced apart from the first intermediate gear 32 and configured to rotate about a second intermediate axis O3 parallel to the drive axis O1; a first driven gear 34 that meshes with the first intermediate gear 32 at a position spaced apart from the drive gear 31 and configured to rotate about a first driven axis O4 parallel to the drive axis O1; a second driven gear 35 that meshes with the second intermediate gear 33 at a position spaced apart from the drive gear 31 and configured to rotate about a second driven axis O5 parallel to the drive axis O1; a first impeller 410 and a second impeller 420 that are connected to the first driven gear 34 and configured to compress a working fluid supplied from an outside by rotation of the first driven gear 34; and a third impeller 430 and a fourth impeller 440 that are connected to the second driven gear 35 and configured to compress a working fluid supplied from the outside by rotation of the second driven gear 35, in which, when viewed from an axial direction Da in which the drive axis O1 extends, the drive axis O1 is disposed below the first intermediate axis O2, the second intermediate axis O3, the first driven axis O4, and the second driven axis O5 in a vertical direction Dv, and in a case where the working fluid is compressed in order from the first impeller 410 to the fourth impeller 440, the first impeller 410 has a larger outer diameter than outer diameters of the second impeller 420, the third impeller 430, and the fourth impeller 440.

Thus, the drive gear 31 is disposed such that the drive axis O1 is disposed below the first intermediate axis O2 and the first driven axis O4 in the vertical direction Dv. Therefore, even in a case where the load acting upward in the vertical direction Dv on the first intermediate gear 32 and the weight of the first intermediate gear 32 are balanced, the pressure load in the horizontal direction Dh received from the drive gear 31 and the pressure load in the horizontal direction Dh received from the first driven gear 34 cannot be balanced. As a result, the first intermediate spindle 321 can maintain a slightly eccentric state with respect to the radial bearing 51 in the horizontal direction Dh. Thus, the first intermediate spindle 321 can be continuously supported by the radial bearing 51 in a stable state. Furthermore, even if the sizes of the impellers 40 connected to the first driven gear 34 and the second driven gear 35 are different, unstable vibration in the first intermediate gear 32 can be suppressed.

(2) A geared compressor 1 according to a second aspect is the geared compressor 1 described in (1), in which, when viewed from the axial direction Da, positions of the first intermediate axis O2, the second intermediate axis O3, the first driven axis O4, and the second driven axis O5 in the vertical direction Dv are the same.

Thus, the positional relationships of the first intermediate gear 32 and the second intermediate gear 33 with respect to the first driven gear 34 and the second driven gear 35 can be made the same. Therefore, it is possible to reduce a transmission torque to the first intermediate gear 32 when the load in the vertical direction Dv acting on the first intermediate gear 32 is balanced. By reducing the transmission torque, a state in which the load in the vertical direction Dv acting on the first intermediate gear 32 is balanced can be passed at an early timing after the geared compressor 1 is started and the first intermediate gear 32 starts to rotate. Therefore, at a timing when the geared compressor 1 is operating at a rated speed, the load in the vertical direction Dv acting on the first intermediate gear 32 is no longer balanced, and the unstable vibration in the first intermediate gear 32 can be effectively suppressed.

(3) A geared compressor 1 according to a third aspect is the geared compressor 1 described in (1) or (2), in which, when viewed from the axial direction Da, an offset angle formed by a first imaginary inclined line VC1 connecting the drive axis O1 and the first intermediate axis O2 with respect to an imaginary horizontal line VH connecting the first intermediate axis O2 and the second intermediate axis O3 is 15° or more and 35° or less.

Thus, the position of the drive spindle 311 in the horizontal direction Dh can be sufficiently separated from the first intermediate gear 32 and the second intermediate gear 33 while the pressure load in the horizontal direction Dh received by the first intermediate gear 32 and the second intermediate gear 33 from the drive gear 31 is ensured. Thus, unstable vibration in the first intermediate gear 32 can be effectively suppressed without limiting the size of the impeller 40 that can be disposed.

(4) A geared compressor 1 according to a fourth aspect is the geared compressor 1 described in any one of (1) to (3), in which the drive gear 31 has a smaller outer diameter than outer diameters of the first intermediate gear 32 and the second intermediate gear 33, and the first driven gear 34 and the second driven gear 35 have smaller outer diameters than an outer diameter of the drive gear 31.

Thus, regarding the first intermediate gear 32 and the second intermediate gear 33, the pressure load in the horizontal direction Dh received from the drive gear 31 can be larger than the pressure load in the horizontal direction Dh received from the first driven gear 34 and the second driven gear 35. As a result, the pressure load in the horizontal direction Dh received from the drive gear 31 and the pressure load in the horizontal direction Dh received from the first driven gear 34 and the second driven gear 35 can be reliably shifted. Thus, the drive spindle 311 can be reliably maintained in a slightly eccentric state with respect to the radial bearing 51 in the horizontal direction Dh. Therefore, the unstable vibration in the first intermediate gear 32 can be reliably suppressed.

EXPLANATION OF REFERENCES

1: Geared compressor
2: Drive device
21: Output shaft
3: Compression section drive mechanism
30: Gear case
31: Drive gear
311: Drive spindle
O1: Drive axis
312: Drive gear main body
32: First intermediate gear
321: First intermediate spindle
O2: First intermediate axis
322: First intermediate gear main body
33: Second intermediate gear
331: Second intermediate spindle
O3: Second intermediate axis
332: Second intermediate gear main body
34: First driven gear
341: First driven spindle
O4: First driven axis
342: First driven gear main body
35: Second driven gear
351: Second driven spindle
O5: Second driven axis
352: Second driven gear main body
VH: Imaginary horizontal line
VC1: First imaginary inclined line
VC2: Second imaginary inclined line
51: Radial bearing
52: Thrust bearing
4: Compression section
40: Impeller
41: First-stage compression section
410: First impeller
42: Second-stage compression section
420: Second impeller
43: Third-stage compression section
430: Third impeller
44: Fourth-stage compression section
440: Fourth impeller
Da: Axial direction
Da1: One side
Da2: Other side
Dv: Vertical direction
Dh: Horizontal direction

What is claimed is:

1. A geared compressor comprising:
   a drive gear that configured to rotate about a drive axis by rotation of a drive device;
   a first intermediate gear that meshes with the drive gear and configured to rotate about a first intermediate axis parallel to the drive axis;
   a second intermediate gear that meshes with the drive gear at a position spaced apart from the first intermediate gear and configured to rotate about a second intermediate axis parallel to the drive axis;
   a first driven gear that meshes with the first intermediate gear at a position spaced apart from the drive gear and configured to rotate about a first driven axis parallel to the drive axis;
   a second driven gear that meshes with the second intermediate gear at a position spaced apart from the drive gear and configured to rotate about a second driven axis parallel to the drive axis;
   a first impeller and a second impeller that are connected to the first driven gear and configured to compress a working fluid supplied from an outside by rotation of the first driven gear; and
   a third impeller and a fourth impeller that are connected to the second driven gear and configured to compress a working fluid supplied from the outside by rotation of the second driven gear,
   wherein, when viewed from an axial direction in which the drive axis extends, the drive axis is disposed below the first intermediate axis, the second intermediate axis, the first driven axis, and the second driven axis in a vertical direction, and
   in a case where the working fluid is compressed in order from the first impeller to the fourth impeller, the first impeller has a larger outer diameter than outer diameters of the second impeller, the third impeller, and the fourth impeller.

2. The geared compressor according to claim 1, wherein, when viewed from the axial direction, positions of the first intermediate axis, the second intermediate axis, the first driven axis, and the second driven axis in the vertical direction are aligned in same plane.

3. The geared compressor according to claim 1, wherein, when viewed from the axial direction, an offset angle formed by a first imaginary inclined line connecting the drive axis and the first intermediate axis with respect to an imaginary horizontal line connecting the first intermediate axis and the second intermediate axis is 15° or more and 35° or less.

4. The geared compressor according to claim 1, wherein the drive gear has a smaller outer diameter than outer diameters of the first intermediate gear and the second intermediate gear, and the first driven gear and the second driven gear have smaller outer diameters than an outer diameter of the drive gear.

\* \* \* \* \*